United States Patent
Lapelosa

(10) Patent No.: US 10,826,356 B2
(45) Date of Patent: Nov. 3, 2020

(54) AIR COOLING FILTER FOR ELECTRIC MOTOR AND RELEVANT MOUNTING SUPPORT

(71) Applicant: NITTY-GRITTY S.R.L., Modena (IT)

(72) Inventor: Michele Lapelosa, Bolognese (IT)

(73) Assignee: NITTY-GRITTY S.R.L., Modena (IT)

( * ) Notice: Subject to any disclaimer, the term of this patent is extended or adjusted under 35 U.S.C. 154(b) by 209 days.

(21) Appl. No.: 16/064,365

(22) PCT Filed: Dec. 21, 2016

(86) PCT No.: PCT/IT2016/000303
§ 371 (c)(1),
(2) Date: Jun. 20, 2018

(87) PCT Pub. No.: WO2017/109809
PCT Pub. Date: Jun. 29, 2017

(65) Prior Publication Data
US 2019/0006915 A1     Jan. 3, 2019

(30) Foreign Application Priority Data

Dec. 21, 2015   (IT) ............... UB2015A9423

(51) Int. Cl.
*H02K 9/26* (2006.01)
*B01D 46/10* (2006.01)
(Continued)

(52) U.S. Cl.
CPC .......... *H02K 9/26* (2013.01); *B01D 46/0005* (2013.01); *B01D 46/0016* (2013.01);
(Continued)

(58) Field of Classification Search
CPC ... H02K 9/26; H02K 9/04; H02K 9/14; B01D 46/0005; B01D 46/0016; B01D 46/10; B01D 46/0004; B01D 2265/06
See application file for complete search history.

(56) References Cited

U.S. PATENT DOCUMENTS

| 4,498,989 A | 2/1985 | Miyakawa et al. |
| 4,826,512 A | 5/1989 | Fuller |
(Continued)

FOREIGN PATENT DOCUMENTS

| EP | 0791387 A1 | 8/1997 |
| GB | 1292186 A | 10/1972 |

OTHER PUBLICATIONS

International Search Report in PCT/IT2016/000303 dated May 29, 2017.

*Primary Examiner* — Emily P Pham
(74) *Attorney, Agent, or Firm* — McGinn I.P. Law Group, PLLC

(57) ABSTRACT

A cooling air filter for an electric motor, includes a filter with a planar shape and minimum dimension so as to cover the area of the slits of a covering casing of a fan for an electric motor for which it is intended; and the filter is housed in a support which is fixed in a steady and removable way on the surface of the casing; the support having a frame-like structure from which at least two arms extend, which are diametrically opposite in the frame-like structure, and which are provided at their end with fixing and gripping means of the arms on the casing itself; the fixing means being configured for the fast detachment from and hooking onto said casing.

17 Claims, 5 Drawing Sheets

(51) Int. Cl.
*H02K 9/14* (2006.01)
*B01D 46/00* (2006.01)
*H02K 9/04* (2006.01)

(52) U.S. Cl.
CPC ............. *B01D 46/10* (2013.01); *H02K 9/04* (2013.01); *H02K 9/14* (2013.01); *B01D 46/0004* (2013.01); *B01D 2265/06* (2013.01); *B01D 2279/45* (2013.01)

(56) References Cited

U.S. PATENT DOCUMENTS

| | | |
|---|---|---|
| 5,493,160 A | 2/1996 | Botten |
| 2011/0083409 A1 | 4/2011 | Bannister |
| 2012/0192535 A1* | 8/2012 | Schrewe ................ B01D 46/10 55/385.3 |
| 2012/0240540 A1 | 9/2012 | Metzger et al. |
| 2013/0025454 A1* | 1/2013 | Moredock .......... B01D 46/2414 95/268 |

* cited by examiner

AIR COOLING FILTER FOR ELECTRIC MOTOR AND RELEVANT MOUNTING SUPPORT

FIELD OF THE INVENTION

The present invention relates to a cooling aft filter for an electric motor and related mounting support, that is to say, to a passive device that, when it is inserted in the cooling airflow of an electric motor, filters its air and allows the latter to be purified from fine dust and droplets of sprayed liquids present in it as a suspension.

PRIOR ART

The prior art already includes the custom of using filters to purify the cooling air moved by the fan of an electric motor. That is to say, it is known to apply to the case of the electric motor, in such a way as to cover the casing of the coding fan, a coating of filtering material that prevents the sucked air from directly reaching the fan, having first to cross said filtering material. Moreover, the coating is fully made of filtering material, typically a layer of non-woven fabric, in such a way as to use a large amount of filtering material even if only a small part of said coating is crossed by the sucked airflow.

In use, considering that the employment of these filters in electric motors is constant, after a prearranged time period they must be replaced to have a new filtering surface which is not clogged by the fine dust and/or by the sprayed liquids it holds. Therefore, with said coating the amount of filtering material is very large in proportion to the surface actually used to filter the air.

Efforts were made to solve these drawbacks, as described in the prior art document JP2004108602, using a layer of filtering material that is stuck, by means of a double-sided adhesive element, on the slits on the outside of the protection casing of the cooling fan of the electric motor.

The main limit of this embodiment lies in the inconvenience of keeping the adhesion efficient, that is to say, enabling the detachment of the filtering material from the protection casing of the fan or even its destruction at the moment of detachment if the adhesive is strong to prevent its detachment. Furthermore, considering the frequency of replacement of the filtering material, it is necessary to put a new filtering material every week and, on average, the operation of replacement is frequent and must be fast, to avoid unnecessary delays for a maintenance operator who has to intervene on all the installations of the machines in operation, which are often many in a workshop.

A filter applicable on the outside of a retaining casing of an electrical alternator for a motor vehicle, which is demountable and replaceable in the filtering part, is known in the art from document GB1292186. The filter has a frame provided with four hooking members, in a direction perpendicular to the positioning plane of the filter, within a seat specifically shaped in the casing of the alternator for the housing of the filter. In the body of the filter there is a tongue, parallel to the hooking members, which closes the electrical circuit of operation of the alternator when inserted. The fan is axially opposite to the body of the alternator itself so as to be in opposition to the casing and to the related housing seat of the body of the filter, which has a specific shape, also considering the desired effect of interruption of the electrical circuit.

Such an arrangement of parts, as set forth in said document, does not help overcome the problem of realizing a supporting frame for a filter that can be applied in a fast and versatile way on generic casings of electric motors built according to the standardization regulations and which are used in the motorization of workshop machinery, that is to say, in a field of art which is completely different from the endothermic engines for and vehicles.

In the art is also know document U.S. Pat. No. 5,493,160 A that shows to build-up a multiple filter for electric motor with brushes in the cooling air stream to avoid the dispersion of graphite micro-particles when used; to reach high cooling capacity without raising the temperature of the electric motor the filtering surface is high thus the filtering material is disposed in the form of a cube or box on the air outlet of the electric motor; more openings are made in the electric motor and more filters are secured each on an opening; the fixing takes place by means of a C-shaped section and the use of glue or hook-and-loop tape fabric (VELCRO) is used for fastening the filter material to the mouth of the air outlets.

Furthermore, in the art is also know document U.S. Pat. No. 4,286,512 A that illustrates a horizontal tubular filter radially filtering the aft flowing through it; it has a tubular housing with axial and longitudinal rotation support inside the compressed air flow filter; the tubular housing have a removable cover to provides access to the housing for insertion and removal of a filter cartridge. The air filter cartridge is rotatably supported by a centrally hollow rotary table and there are permanent magnets inserted to constitute axial rotational joint between the annular end plates, of ferrous metal capable of being magnetically attracted, of the filter cartridge and the rotary table, thus to work better with the projected dimensions.

In the art, the document US 2012/240540 A1 shows the construction of a filter housing with foldable fasteners by means of a breaking point to form the latching element of each foldable fastener; the latching elements are described as foldable ears that, when mounting the filter housing, are protruded by the body on which the housing is attached; each element further comprises, in addition to the respective ears, a hook connecting with an insertion edge, provided in the constitution of the housing, in order to keep the ear in contact with the respective protuberance when mounted; the breaking point is made at the base of each latching element in the direction of the folding axis without any position change.

Moreover, document US 2011/083409 A1 from specific art of building filter support means shown a housing for containing a filter in which a filter closure head, where the cylindrical cartridge type filter is contained, is closed by a lid secured by hooks with toggle joints; the hooks movement holding the edge in order to compress the sealing gasket between the edge of the cover and its seat, specially provided, in the seat of the filter housing with specific defined dimension.

Finally, in the systematic use of the filtering of the cooling air of the electric motors of machine tools the large number of motors that a machine can have and that, notoriously, have a standard shape according to the construction norms of electric motors, requires the possibility for a fast maintenance intervention with the replacement of the filtering material, to make the operation inexpensive, also in the case of electric motors with different dimensional and physical characteristics that are all provided by the specific construction norms.

Said prior art is subject to significant improvements with reference to the possibility of realizing a cooling air filter for an electric motor and related mounting support, which overcomes the above-mentioned limits of the prior art, introducing a new way of mounting, use and management of the cooling air filters in the electric motors of workshop machines.

Therefore, the technical problem, which is at the basis of the present invention, is to realize a cooling air filter for an electric motor and related mounting support, which is practical, inexpensive and fast in the mounting and maintenance with the replacement of the filtering material housed in it and which is suitable for the various configurations provided by the dimensional construction norms of electric motors.

An inherent aim in the previous technical problem consists in making steady, but easily decomposable, the grip of the mounting support of the cooling air filter.

An additional aim of the present invention is to allow, according to user requirements, to use the mounting support of the cooling air filter of an electric motor, when one wants to replace the electric motor and the new motor has different physical or dimensional characteristics of the protection casing of the cooling fan.

Finally, an additional part of the technical problem and of completion of what has been outlined above is to make the frequent replacement of the filtering material easy and simple allowing the support to be dismounted from and re-mounted onto the electric motor without damaging the filter or the support itself.

SUMMARY OF THE INVENTION

This problem is solved, according to the present invention, by a cooling air filter for an electric motor built according to the standardization regulations as mentioned in claim 1.

Further features and the advantages of the present invention, in the realization of a cooling air filter for an electric motor and related mounting support, will appear from the following description of some embodiments given as an indicative and non-exhaustive example, with reference to the five drawing tables enclosed.

SHORT DESCRIPTION OF THE DRAWINGS

DETAILED DESCRIPTION OF PREFERRED EMBODIMENTS

Figure 11:
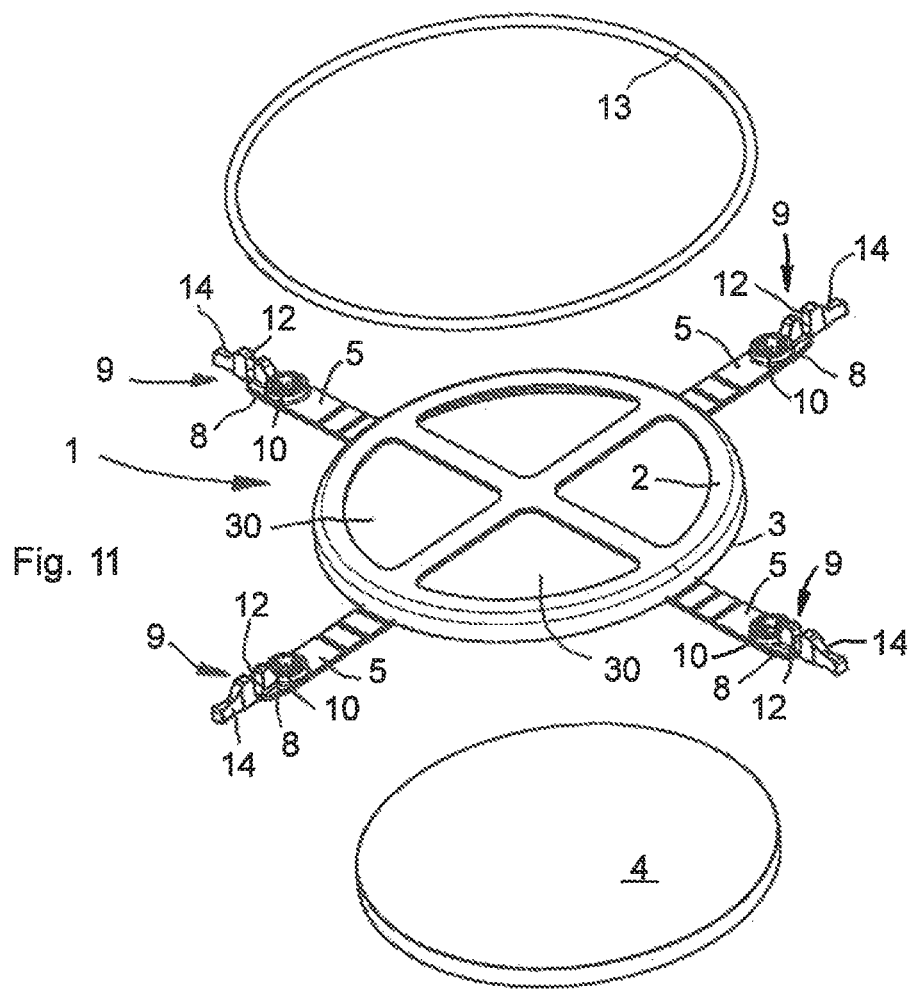
FIG. 11 shows a schematic perspective view of a cooling air filter of an electric motor according to the embodiment of FIGS. 1-8, with its support and an elastic element for fixing the arms of the support.
Figure 12:
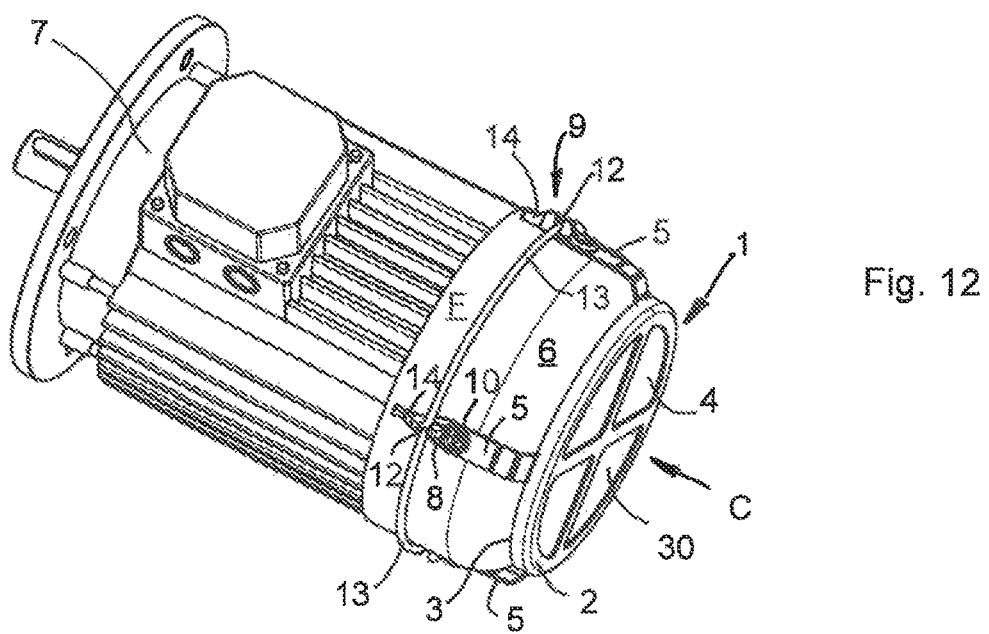
FIG. 12 shows a schematic perspective view of the support of FIGS. 1-8, here mounted on the metal casing of a generic electric motor in which the positioning of the end of the arms occurs by the action of a ring-shaped elastic element, which keeps the arms of the support in position.

In FIGS. 1 to 7 a support 1 for an air filter comprises a frame-like support 2, advantageously ring-shaped, provided with a centering edge 3 of a filter 4, advantageously disc-shaped; from said edge 3 at least two arms 5 extend in radial opposition, foldable and opposite to each other, to follow the shape of the covering casing 6 of the fan of an electric motor 7, the ring-shaped support 2 is centred on the front C of the casing in correspondence of the air suction slits of the cooling fan, the fan and slits not being shown; each foldable arm comprises at its end 8 gripping means 9 for the positioning of said end on the side F of the casing 6 of the electric motor 7. The gripping means 9 of the arm consist of an interlocking seat 10 for a permanent magnet 11, a groove 12 for receiving an annular fixing means 13, advantageously an elastic ring, visible in FIGS. 11 and 12, which is inserted in said grooves and keeps the ends of the foldable arms 5 against the casing 6. To complete the end 8 there is a tapered shape 14, to facilitate grasping by the fingers of a maintenance-operator to allow him/her to position the end of the foldable arm correctly.

Figure 1:
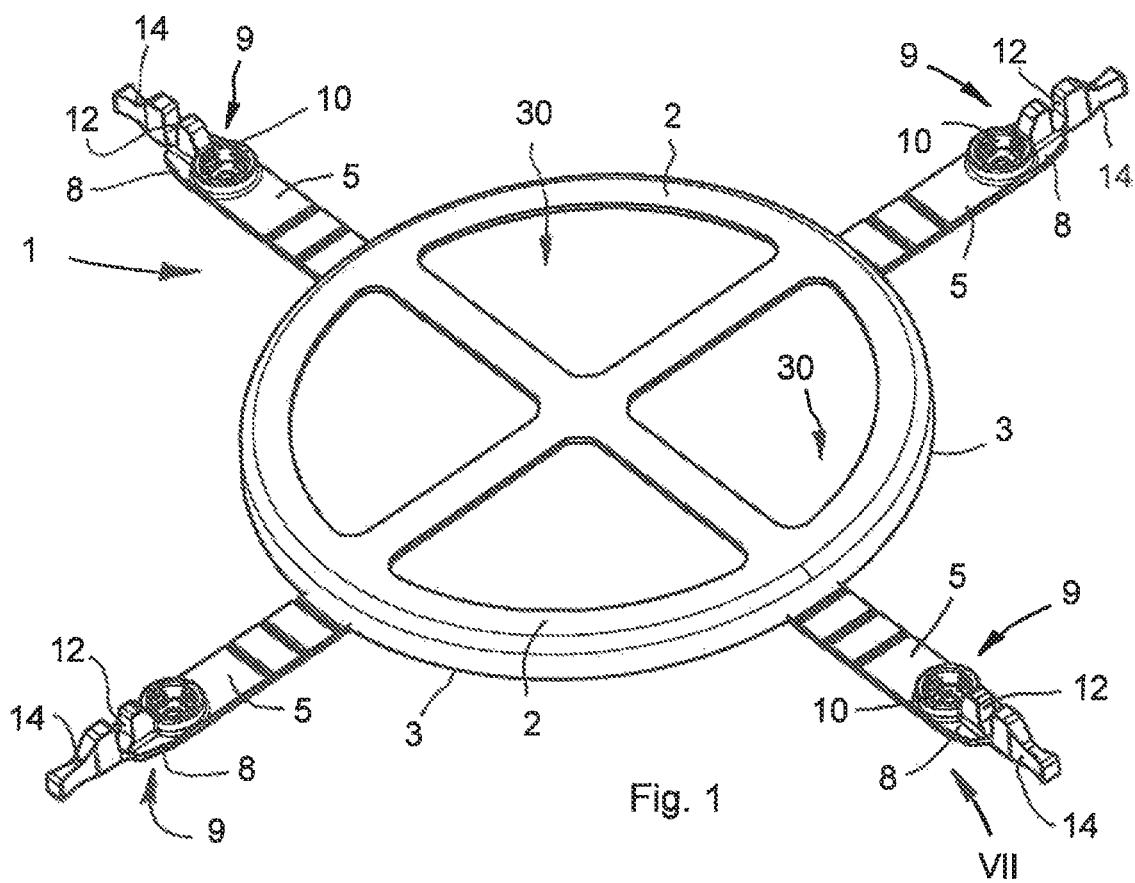
FIG. 1 shows a schematic perspective view of a filter support according to the invention before being mounted on the casing that covers the cooling fan in an electric motor.
Figure 2:
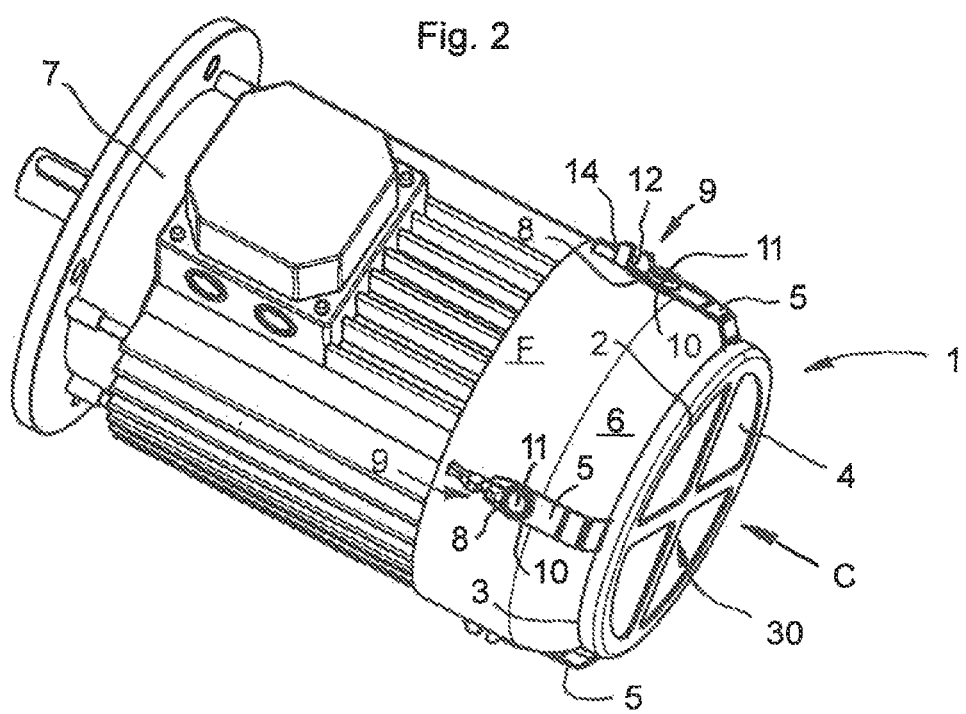
FIG. 2 shows a schematic perspective view of the support of FIG. 1, here mounted on the metal casing of a generic electric motor in which the positioning of the ends of the arms occurs by a magnetic action.
Figure 4:
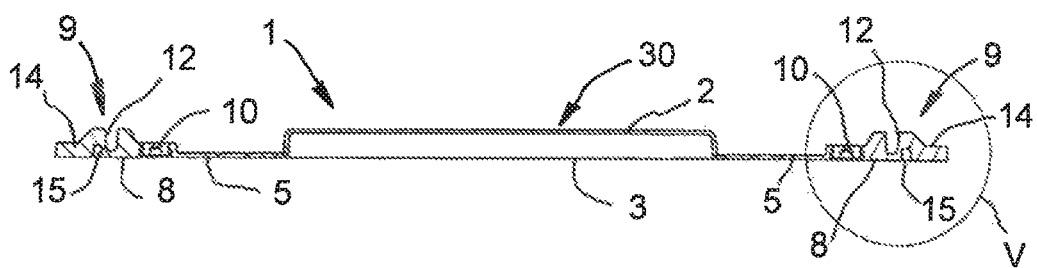
FIG. 4 shows a schematic sectional view taken along the line IV-IV of FIG. 3.
Figure 3:
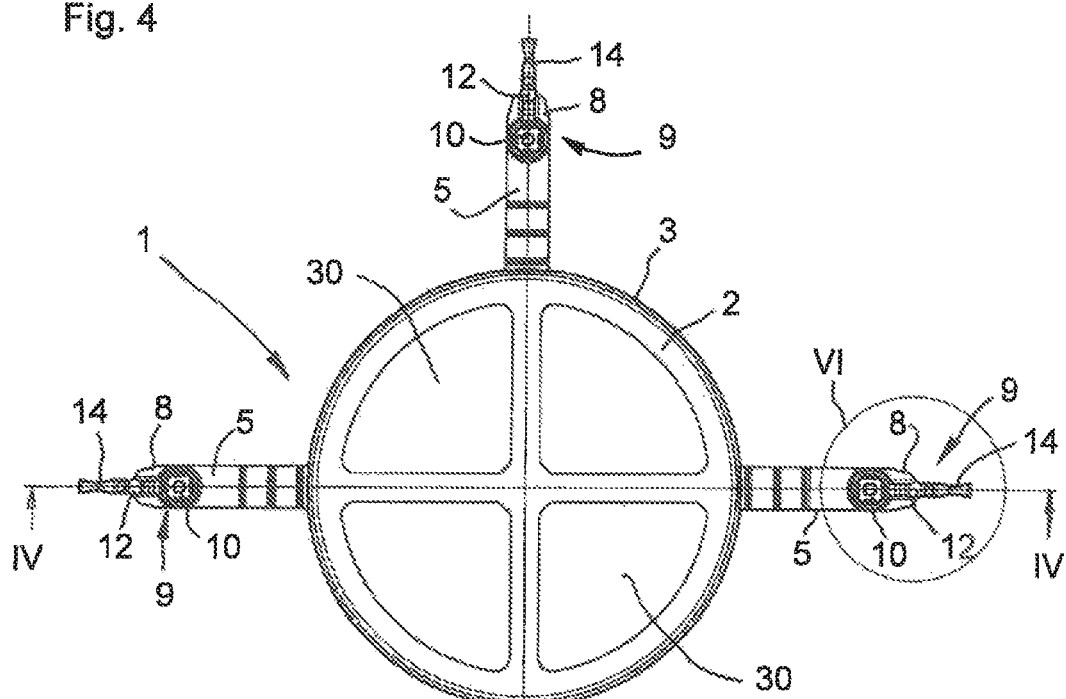
FIG. 3 shows a schematic plan view of a filter support used in the previous Figures.
Figure 5:
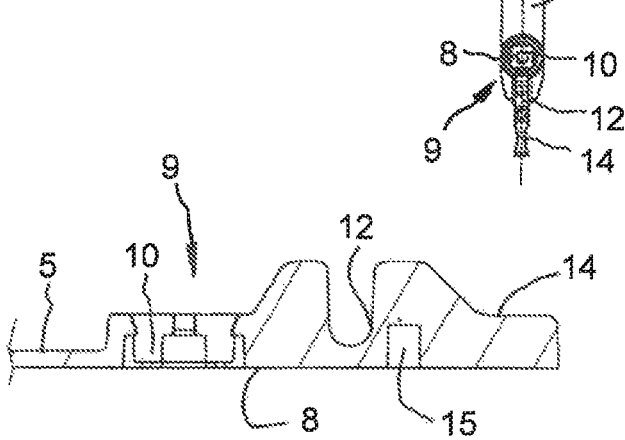
FIG. 5 shows a schematic enlarged view of the portion V of the section of FIG. 4.
Figure 6:
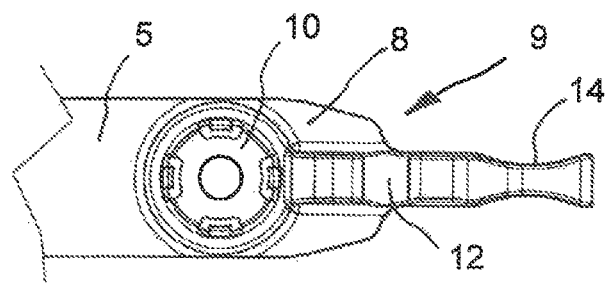
FIG. 6 shows a schematic enlarged view of the portion of FIG. 3.
Figure 7:
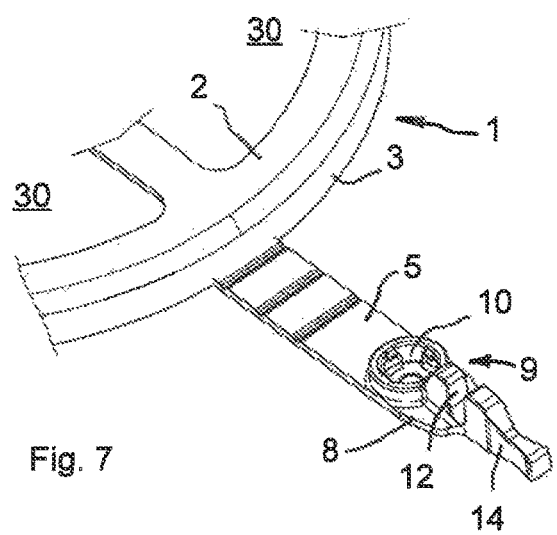
FIG. 7 represents a schematic enlarged view in a limited perspective in the direction VII of FIG. 1.
Figure 8:
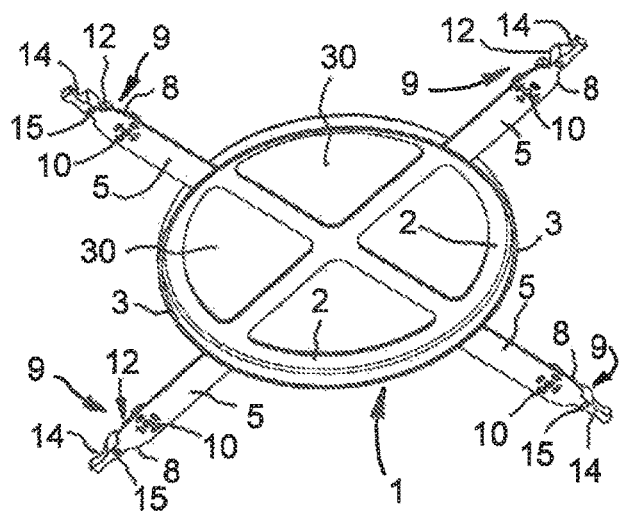
FIG. 8 shows a schematic view in lower perspective, that is to say, the casing side of the electric motor, of the filter support of FIG. 1.
Figure 13:
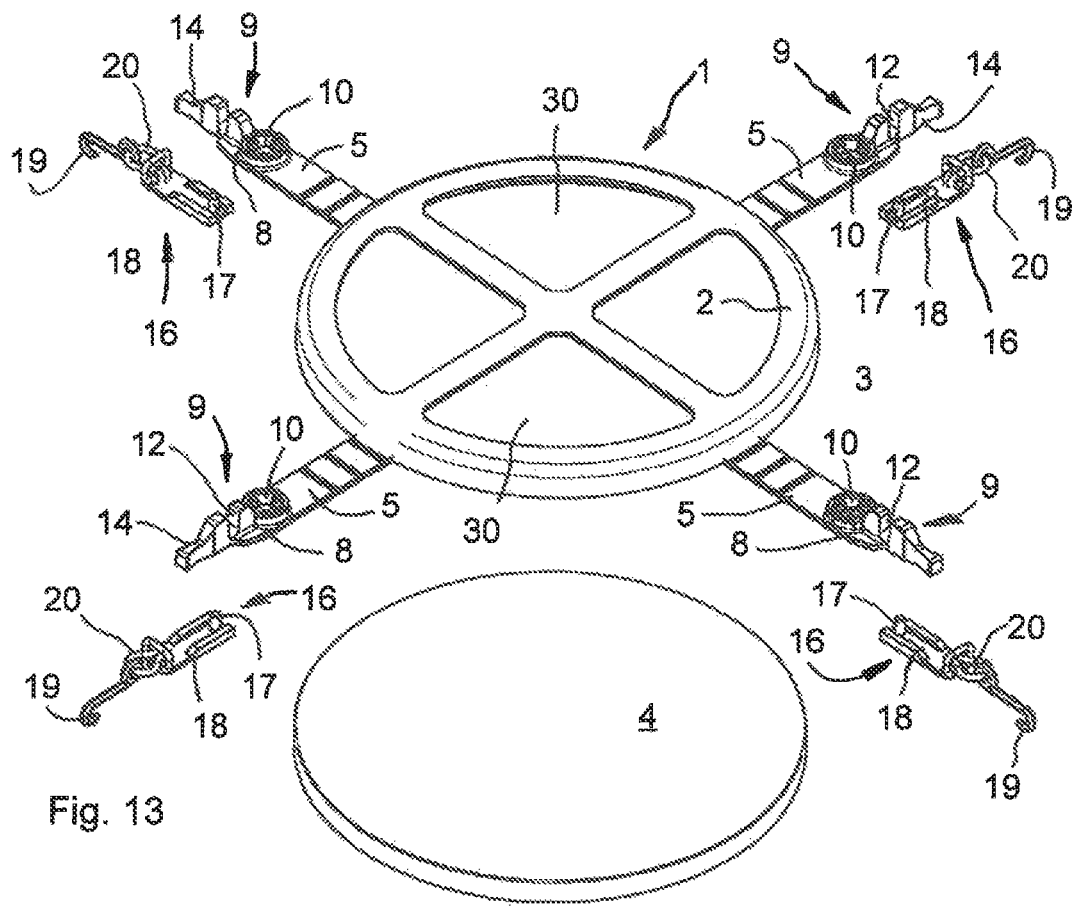
FIG. 13 shows a schematic perspective view of a cooling air filter of an electric motor according to the embodiment of FIGS. 1-8, with its support and added extensible elastic fixing elements provided with an end hook, one for each arm of the support.
Figure 14:
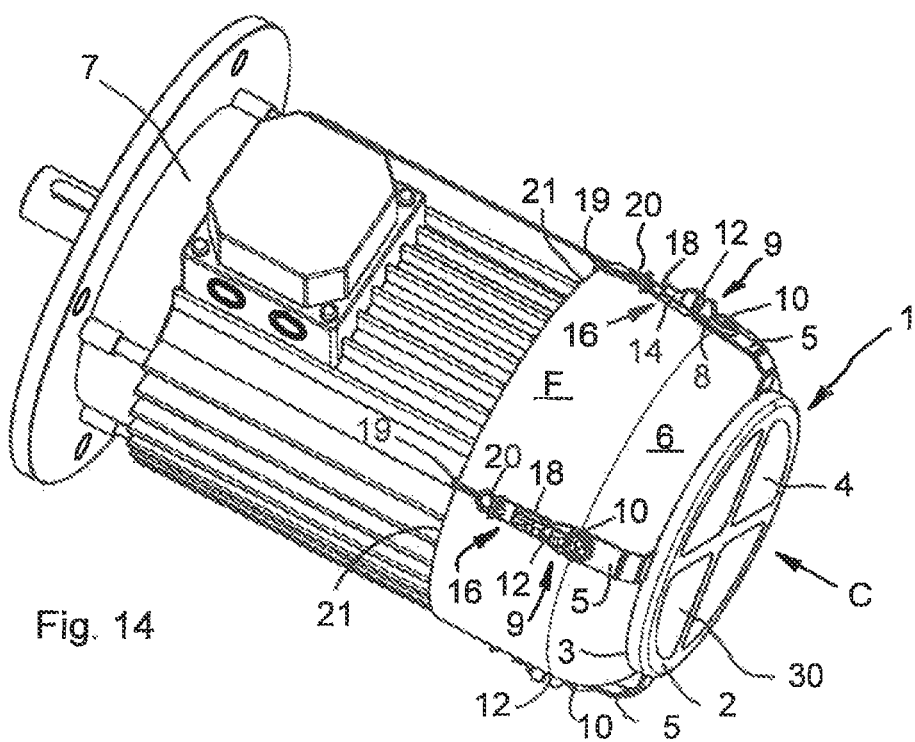
FIG. 14 shows a schematic perspective view of the support of FIGS. 1-8, here mounted on the casing of a generic electric motor in which the fixing of the arms occurs at the ends of the arms by the action of an elastic element, each arm being provided with a hook, which hooks the arm on the edge of the protection casing of the fan of the electric motor.

In FIGS. 4, 5 and 8 one can also see a connection hole 15 for an elastic element 16, visible in FIGS. 13 and 14, as a further element and mounting variant of the gripping means of a foldable arm 5 on a casing 6 and in the absence of a permanent magnet 11, or if the casing is not ferromagnetic, in the absence of an annular means 13, or elastic ring. Said elastic element 16 being made up of a male element 17, intended for the coupling in the hole 15 and of a body 18, for joining said male element with a hook 19, connected with a rubber band 20 to said body 18. The hook 19 grips on the terminal edge 21 of the casing 6, in such a way as to keep the foldable arm 5 in position and, as a consequence, also the ring-shaped frame-like support 2, with the filter 4.

Figure 9:
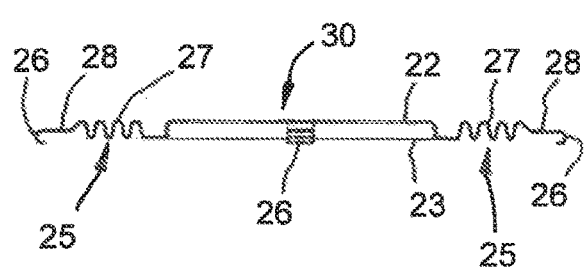
FIG. 9 shows a schematic side view of a filter support, according to the invention, of a specific embodiment with elastic grip of the edge of a casing for an electric motor.
Figure 10:
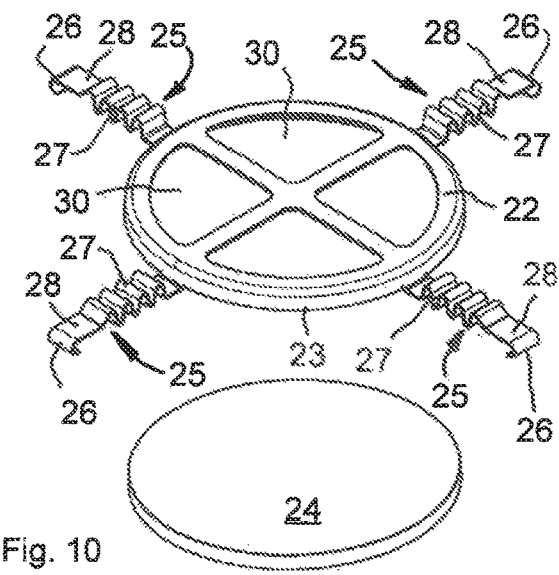
FIG. 10 shows a schematic perspective view of a cooling air filter for an electric motor with its support, according to the embodiment of FIG. 9.

In FIGS. 9 and 10, of a specific embodiment, a frame like support 22, advantageously ring-shaped, has a retaining edge 23 of a filter 24, advantageously disc-shaped, and is provided with foldable and elastic arms 25 ending with a hook 26, bent for the grip of an edge 21 of a casing 6 of an electric motor, similarly to what is shown in FIG. 14. Each foldable and elastic arm 25 has a bellows configuration 27, in such a way as to obtain the extension elasticity of the hook 26, for the elastic extension by deflection of the material of which it is made, with respect to the frame-like support 22 and grip on said edge 21 of the casing 6. Moreover, in the absence of a hook 26 or in replacement of the latter at the end 28 of one arm 25, or even in coupling with an end 8 of one arm 5, one can apply a fabric with fabric gripping microhooks (trade name Velcro®) which engages in a portion of fabric glued in a firm way on the surface of a casing 6 of a cooling fan for an electric motor (embodiment not shown).

The frame-like support 2 or 22 and the retaining edge of the filter 4 or 24 is advantageously made of transparent material, to be able to see the progressive clogging of the filter with the fine dust and with the spraying of liquids: a greater clogging is detectable from the greater penetration, and consequent blackening of the material of the filter, in the thickness of the filter itself. In this way the user can decide whether to continue to use the filter or replace it.

The use of the support for the cooling air filter for an electric motor is clear from the enclosed figures. The filter support is thus a new and practical means for positioning a filter 4 or 24, which is disc-shaped only to imitate the ventilation slits of a casing 6, but which can also be square, rectangular, triangular, hexagonal or of another shape, and by the use of the support according to the present invention it is easily mounted on a casing 6 of a generic electric motor 7. The mounting on an electric motor is made on any constructive form of motors, with the only necessary limit that the size of the filter 4 or 24 is not much greater than the size of the slits of the protection casing of the cooling fan of the electric motor. Obviously the size of the filter should be equal to the width of the slits in the casing as well as the openings 30 in the support 2 or 22.

By the proposed embodiments of the foldable arms of the support the grip is performed in any efficient way: with magnetic means, that is to say, with the permanent magnet 11 housed in the seat 10, which holds the magnet in the end 8 of the arm 5, and, when drawn close to the ferromagnetic external surface of a casing 6, is able to fix the position of the end 8 of the foldable arm 5. Similarly, the presence of a groove 12 in the end of the arm allows to house in it an annular means 13, which can consist of a flexible and extensible elastic ring, or of a broken and flexible metal ring, made of material for springs, in such a way that it behaves like an elastic ring, which holds the ends 8 where it is inserted against a casing 6, when the latter is not ferromagnetic or does not have the permanent magnets.

Thus, in the embodiment with the hook 19 or 26, the end of one arm 5 or 25 is fixed to the edge 21 of a casing 6 of an electric motor, slightly tensioning the elastic part of the arm: be it the bellows part 27 or the rubber band part 20 to hook said hook to the edge 21 of the casing after tensioning said elastic part.

The advantages in the use of a cooling air filter for an electric motor can be summarized in the practicality of mounting and following maintenance of each of the described embodiments, either by magnetic fastening, or by fastening with an annular elastic means or with a tensioned elastic means. Last but not least, also the embodiment with the microhooks gripping element (trade name Velcro®) is advantageous, in the specific need to apply and detach several times, in the expected life of the filter support, and replace the filter 4 or 24 itself.

The realization of said fixing means can occur individually on a filter support, that is to say, the support being provided during construction with only one of said fixing means, but more advantageously two or more of said fixing means are combined during construction on one single support 1, as depicted, in such a way as to leave the user free to select which of the fixing means to use in the application of the cooling air filter for electric motor he/she wants to carry out.

Obviously, to the above-described cooling air filter for an electric motor and related mounting supports a person skilled in the art, in order to meet specific and contingents needs, can make several changes, which will all be included within the scope of protection of the present invention as defined by the following claims. Obviously, although less advantageously, a support for a cooling air filter can be applied to electric motors whose shape is not necessarily cylindrical, it being possible, as stated in the text, to shape the frame-like support with a perimeter having a varied shape and at least two radially opposite arms 5. Moreover, the length of the arms 5 being able to be limited and the dripping means 9 gripping directly on the front C of the casing 6 of an electric motor, optionally with a permanent magnet, if the casing is ferromagnetic, or even with a fabric having fabric gripping microhooks (trade name Velcro®) which engages in a portion of fabric glued in a steady way on the surface of the casing. In both the embodiments, which have just been described, there always remaining the steady and removable fixing of the frame-like support, when required, for the replacement of the filtering material constituting the filter.

The invention claimed is:

1. A cooling air filter for an electric motor built according to standardization regulations, the cooling air filter comprising:
    a filtering material with a planar shape and a minimum dimension so as to cover an area of slits of a covering casing of a cooling fan of the electric motor, operating in suction for cooling of the electric motor for which the cooling air filter is intended,
    wherein the filtering material is housed in a support which is fixed in a steady and removable way on an external curved surface of the covering casing of the cooling fan,
    wherein the support included a frame-like support, with a centering edge of the filtering material, from which at least two arms extend, diametrically opposite in the frame-like support, and are foldable and lie on the external curved surface of the covering casing of the cooling fan,
    wherein the at least two arms are provided with fixing and gripping means on the covers casing of the cooling fan of the electric motor and the frame-like support and of the filtering material are held against the slits of the covering casing of the cooling fan of the electric motor, and
    wherein steady and removable fixing means are configured for a fast detachment from and hooking onto said external curved surface of the covering casing of the cooling fan.

2. The cooling air filter according to claim 1, wherein the at least two arms of said steady and removable fixing means are provided with a fabric, including fabric gripping microhooks, which engages in a portion of the fabric glued in a fixed way on the external curved surface of the covering casing for the cooling fan of electric motor.

3. The cooling air filter according to claim 1, wherein the at least two arms of hard steady and removable fixing means are provided with a seat for a permanent magnet within which the permanent magnet is housed, in such a way as to perform gripping by a magnetic attraction on a covering casing of a ferromagnetic material for the cooling fan of electric motor.

4. The cooling air filter according to claim 1, wherein the at least two arms of said steady and removable fixing means are foldable on a side surface of the covering casing of the fan of the electric motor and have a sufficient length for gripping of the fixing and gripping means applied on a cylindrical surface of the covering casing of the fan.

5. The cooling air filter according to claim 4, wherein said steady and removable fixing means comprises an elastic extension made on an elastic element, applied at an end of one arm of the at least two arms, which in itself does not have elasticity in extension, the elastic element being provided with a hook at an end of the elastic element engaging on an edge of the external curved covering casing of the fan of electric motor.

6. The cooling air filter according to claim 4, wherein the at least two arms are foldable on the side surface of the curved covering casing of the cooling fan of the electric motor and are kept on the side surface of the covering casing by ring-shaped elastic element which engages in grooves which are present in an end of each arm of the at least two arms.

7. The cooling air filter according to claim 4, wherein to at least two arms, besides being foldable, are extensible, such that the at least two arms are provided with an elastic extension and a hook at an end engaging on an edge of the external curved covering casing of the cooling fan of electric motor.

8. The cooling air filter according claim 1, wherein at least two different typed of the fixing and gripping means are present simultaneously in a body or an end of each of the at least two arms for steady and removable positioning, in such a way as to allow a user to select using one of the at least two different gripping means.

9. The cooling air filter according to claim 1, wherein at least the frame-like support with centering edge includes a transparent material.

10. The cooling air filter according to claim 1, wherein arm ends of the at least two arms have a tapered shape to facilitate grasping by user's fingers.

11. The cooling air filter according to claim 1, wherein the external curved surface of the covering casing of the cooling fan extends in a radial direction of the covering casing of the cooling fan, and
    wherein a distal end of the frame-like support abuts the external curved surface of the covering casing of the cooling fan.

12. The cooling air filter according to claim 1, wherein the external curved surface of the covering casing of the cooling fan extends in a radial direction of the covering casing of the cooling fan, and
    wherein the centering edge of the filtering material abuts the external curved surface of the covering casing of the cooling fan.

13. The cooling air filter according to claim 1, wherein the external curved surface of the covering casing of the cooling fan extends in a radial direction of the covering casing of the cooling fan, and
    wherein, in the radial direction of the covering casing of the cooling fan, the at least two arms are disposed on the external curved surface of the covering casing of the cooling fan.

14. The cooling air filter according to claim 1, wherein the external curved surface of die covering casing of the cooling fan extends in a radial direction of the covering casing of the cooling fan, and
    wherein, in the radial direction of the covering casing of the cooling fan, the at least two arms overlap with the external curved surface of the covering casing of the cooling fan.

15. The cooling air filter according to claim 1, wherein a mechanism and a structure of one of the fixing and gripping means located at an end of one of the at least two arms is different from a mechanism and a structure of another one of the fixing and gripping means located at an end of another one of the at least two arms.

16. The cooling air filter according to claim 1, wherein the at least two arms extend from a distal end of the centering edge of the filtering material.

17. The cooling air filter according to claim 16, wherein, in an axial direction of the electric motor, a portion of the at least two arms is disposed between the distal end of the centering edge of the filtering material and the fixing and gripping means.

\* \* \* \* \*